US012222663B2

(12) United States Patent
Matsumoto

(10) Patent No.: US 12,222,663 B2
(45) Date of Patent: Feb. 11, 2025

(54) DEVELOPING DEVICE INCLUDING SENSOR HOLDER INCLUDING INSERTION PORTION, PROCESS CARTRIDGE, AND IMAGE FORMING APPARATUS

(71) Applicant: Kentarou Matsumoto, Tokyo (JP)

(72) Inventor: Kentarou Matsumoto, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/133,226

(22) Filed: Apr. 11, 2023

(65) Prior Publication Data

US 2023/0333497 A1 Oct. 19, 2023

(30) Foreign Application Priority Data

Apr. 15, 2022 (JP) ................................. 2022-067431
Sep. 14, 2022 (JP) ................................. 2022-145915

(51) Int. Cl.
*G03G 15/08* (2006.01)
*G03G 15/00* (2006.01)
*G03G 21/16* (2006.01)

(52) U.S. Cl.
CPC ..... *G03G 15/0849* (2013.01); *G03G 15/0853* (2013.01); *G03G 15/0877* (2013.01); *G03G 15/0896* (2013.01); *G03G 15/556* (2013.01); *G03G 21/1647* (2013.01); *G03G 2215/0888* (2013.01)

(58) Field of Classification Search
CPC ........... G03G 15/0849; G03G 15/0877; G03G 15/556; G03G 2215/0888; G03G 21/1821; G03G 15/0896; G03G 15/0853; G03G 15/0893; G03G 2221/1654; G03G 21/1647; G03G 15/0851
See application file for complete search history.

(56) References Cited

U.S. PATENT DOCUMENTS

2016/0378039 A1* 12/2016 Watanabe .......... G03G 15/0849 399/30
2019/0179236 A1* 6/2019 Fukumoto .......... G03G 15/0849
(Continued)

FOREIGN PATENT DOCUMENTS

JP 2006-276151 10/2006
JP 2008-129154 6/2008
(Continued)

OTHER PUBLICATIONS

EESR issued Aug. 16, 2023, in corresponding European Application No. 23167441.7, 8pp.

*Primary Examiner* — Arlene Heredia
*Assistant Examiner* — Laura Roth
(74) *Attorney, Agent, or Firm* — XSENSUS LLP

(57) ABSTRACT

A developing device includes a developing case, a toner concentration sensor, and a positioner. The developing case stores a developer containing toner and carrier to develop a latent image on a surface of an image bearer. The developing case includes at least a part of a conveyance path of the developer. The toner concentration sensor detects a toner concentration of the developer in the developing case. The positioner engages with an engaging portion at a center of a sensor main section of the toner concentration sensor to determine a position of the sensor main section in the developing case.

15 Claims, 5 Drawing Sheets

(56) References Cited

U.S. PATENT DOCUMENTS

| | | | | |
|---|---|---|---|---|
| 2019/0332029 | A1 * | 10/2019 | Fukuhara | G02B 26/12 |
| 2020/0096934 | A1 | 3/2020 | Makita et al. | |
| 2020/0379373 | A1 * | 12/2020 | Ogawa | G03G 15/0877 |
| 2023/0244162 | A1 * | 8/2023 | Tagami | G03G 15/6555 399/328 |
| 2023/0384232 | A1 * | 11/2023 | Inuzuka | G01N 21/86 |

FOREIGN PATENT DOCUMENTS

| | | |
|---|---|---|
| JP | 2008-276118 | 11/2008 |
| JP | 2009-223075 | 10/2009 |
| JP | 2010026031 A * | 2/2010 |
| JP | 2010-224017 | 10/2010 |
| JP | 2012-078724 | 4/2012 |

* cited by examiner

DEVELOPING DEVICE INCLUDING SENSOR HOLDER INCLUDING INSERTION PORTION, PROCESS CARTRIDGE, AND IMAGE FORMING APPARATUS

CROSS-REFERENCE TO RELATED APPLICATIONS

This patent application is based on and claims priority pursuant to 35 U.S.C. § 119(a) to Japanese Patent Application Nos. 2022-067431, filed on Apr. 15, 2022, and 2022-145915, filed on Sep. 14, 2022, in the Japan Patent Office, the entire disclosure of each of which is hereby incorporated by reference herein.

BACKGROUND

Technical Field

Embodiments of the present disclosure relate to a developing device to develop a latent image formed on the surface of an image bearer, a process cartridge including the developing device, and an image forming apparatus including the developing device.

Related Art

Conventionally, in a developing device installed in an electrophotographic image forming apparatus such as a copying machine, a printer, a facsimile machine, or a multifunction peripheral thereof, there has been known a developing device using a toner concentration sensor such as a magnetic sensor in order to detect the toner concentration of a two-component developer stored in the developing device (a ratio of a toner in a developer including the toner and a carrier).

There has been widely known a developing device in which a toner concentration sensor is held in a developing case.

SUMMARY

According to an embodiment of the present disclosure, a developing device includes a developing case, a toner concentration sensor, and a positioner. The developing case stores a developer containing toner and carrier to develop a latent image on a surface of an image bearer. The developing case includes at least a part of a conveyance path of the developer. The toner concentration sensor detects a toner concentration of the developer in the developing case. The positioner engages with an engaging portion at a center of a sensor main section of the toner concentration sensor to determine a position of the sensor main section in the developing case.

According to another embodiment of the present disclosure, a process cartridge includes the developing device and the image bearer integrated with the developing device as a single unit. The process cartridge is installable to and detachable from a main body of an image forming apparatus.

According to still another embodiment of the present disclosure, an image forming apparatus includes the developing device and the image bearer.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
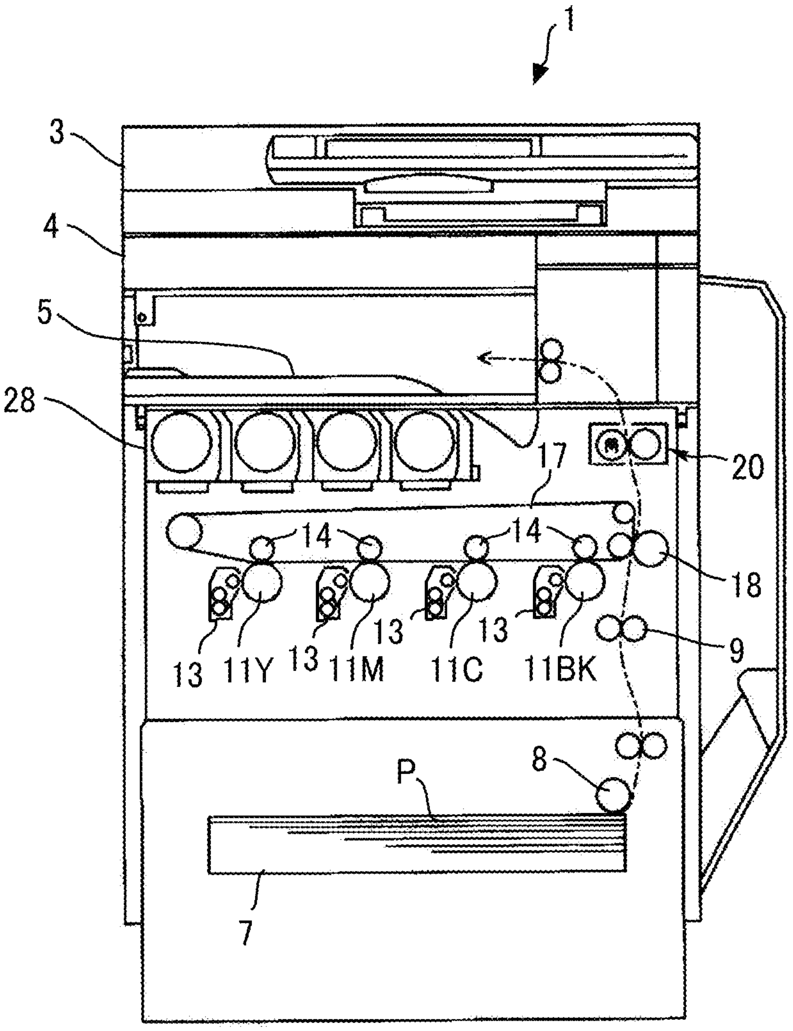
FIG. 1 is a diagram illustrating the general arrangement of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to drawings, embodiments of the present disclosure are described in detail below. Note that identical reference numerals are assigned to identical components or equivalents and a redundant description of those components is appropriately simplified or omitted.

First, with reference to FIG. 1, the overall configuration and operation of an image forming apparatus 1 are described.

FIG. 1 illustrates a tandem color copying machine as the image forming apparatus 1, a document conveying unit 3 that conveys a document to a document scanner, a document scanner 4 that scans image data of a document, and a sheet ejection tray 5 on which an output image is stacked.

FIG. 1 also illustrates a sheet feeding unit 7 that stores a sheet P such as a form, a registration roller 9 that adjusts the conveyance timing of the sheet P, and photoconductor drums 11Y, 11M, 11C, and 11BK as image bearers on which toner images of respective colors (Yellow, Magenta, Cyan, and Black) are formed.

Furthermore, FIG. 1 illustrates a developing device 13 that develops electrostatic latent images formed on the surfaces of the photoconductor drums 11Y, 11M, 11C, and 11BK, and a primary transfer bias roller 14 that transfers toner images formed on the photoconductor drums 11Y, 11M, 11C, and 11BK on the sheet P in an overlapping manner.

In addition, FIG. 1 illustrates an intermediate transfer belt 17 to which toner images of multiple colors are transferred in an overlapping manner, a secondary transfer bias roller 18 for transferring the multicolor toner images on the intermediate transfer belt 17 onto the sheet P, a fixing device 20 for fixing an unfixed image on the sheet P, and a toner container 28 of each color for supplying a toner (toner particles) of each color (Yellow, Cyan, Magenta, Black) to the developing device 13.

A description is provided below of the operation of the image forming apparatus when forming a normal color image.

An image forming process performed on the surfaces of the photoconductor drums 11Y, 11M, 11C, and 11BK can also be described with reference to FIG. 2.

First, a conveyance roller of the document conveying unit 3 conveys a document on a document table onto an exposure glass of the document scanner 4. The document scanner 4 optically scans image data from the document on the exposure glass.

More specifically, the document scanner 4 scans an image of the document on the exposure glass with light emitted from an illumination lamp. The light reflected from the surface of the document is directed onto a color sensor via mirrors and lenses to form multicolor image data. The multicolor image data for the document, which is decomposed into red, green, and blue (RGB) data, is read by the color sensor and converted into electrical image signals. Furthermore, an image processor performs image processing (e.g., color conversion, color calibration, and spatial frequency adjustment) according to the image signals of the decomposed RGB data, and thus image data for yellow, magenta, cyan, and black toner images are obtained.

The image data for yellow, magenta, cyan, and black toner images are transmitted to a writing unit. The writing unit directs a laser beam L (see FIG. 2) onto the surface of the corresponding one of the photoconductor drums 11Y, 11M, 11C, and 11BK according to the image data for each color.

Meanwhile, each of the four photoconductor drums 11Y, 11M, 11C, and 11BK rotates clockwise in FIG. 1. Initially, the surface of each of the photoconductor drums II Y, 11M, 11C, and 11BK is uniformly charged by a charging unit 12 (see FIG. 2) at a position facing the charging unit 12 (charging process). Thus, a charging potential is formed on each of the photoconductor drums 11Y, 11M, 11C, and 11BK. Thereafter, the charged surface of each of the photoconductor drums 11Y, 11M, 11C, and 11BK reaches a position where the surface is irradiated with the laser beam L.

The writing unit emits the laser beam L from each of four light sources according to the image signals so as to correspond to each color. The respective laser beams L pass through different optical paths for the different components of yellow, magenta, cyan, and black (exposure process).

The laser beam corresponding to the yellow component irradiates the surface of the first photoconductor drum 11Y from the left in FIG. 1. A polygon mirror that rotates at high velocity deflects the laser beam for yellow along the axis of rotation of the photoconductor drum 11 (i.e., the main-scanning direction) so that the laser beam L scans the surface of the photoconductor drum 11Y. Thus, an electrostatic latent image corresponding to the image data of yellow is formed on the photoconductor drum 11Y charged by the charging unit 12.

Similarly, the laser beam corresponding to the magenta component irradiates the surface of the second photoconductor drum 11M from the left in FIG. 1, forming an electrostatic latent image corresponding to the magenta component. The laser beam corresponding to the cyan component irradiates the surface of the third photoconductor drum 11C from the left in FIG. 1, forming an electrostatic latent image corresponding to the cyan component. The laser beam corresponding to the black component irradiates the surface of the fourth photoconductor drum 11BK from the left in FIG. 1, forming an electrostatic latent image corresponding to the black component.

Then, the surface of each of the photoconductor drums 11Y, 11M, 11C, and 11BK having the electrostatic latent image reaches a position facing the developing device 13. Then, toners of the respective colors are supplied from the developing device 13 onto the photoconductor drums 11Y, 11M, 11C, and 11BK, and latent images on the photoconductor drums 11Y, 11M, 11C, and 11BK are developed (developing process).

After the developing process, the surfaces of the photoconductor drums 11Y, 11M, 11C, and 11BK reach positions facing the intermediate transfer belt 17. Here, a primary transfer bias roller 14 is installed on each facing portion so as to abut against the inner peripheral surface of the intermediate transfer belt 17. At the position of the primary transfer bias roller 14, the toner images of the respective colors formed on the photoconductor drums 11Y, 11M, 11C, and 11BK are sequentially transferred onto the intermediate transfer belt 17 in an overlapping manner (primary transfer process).

After the primary transfer process, the surface of each of the photoconductor drums 11Y, 11M, 11C, and 11BK reaches a position facing a cleaning unit 15. An untransferred toner remaining on each of the photoconductor drums 11Y. 11M, II C, and 11BK is collected by the cleaning unit 15 (cleaning process).

Thereafter, the surface of each of the photoconductor drums 11Y, 11M, 11C, and 11BK passes through a discharger to complete a series of image forming processes performed on the photoconductor drums 11Y, 11M, 11C, and 11BK.

Meanwhile, the intermediate transfer belt 17 on which the toners of the respective colors on the photoconductor drums 11Y, 11M, 11C, and 11BK are transferred (carried) in an overlapping manner travels counterclockwise in FIG. 1 to reach a position facing the secondary transfer bias roller 18. The multicolor toner image carried on the intermediate transfer belt 17 is transferred onto the sheet P at a position facing the secondary transfer bias roller 18 (secondary transfer process).

After the secondary transfer process, the surface of the intermediate transfer belt 17 reaches the position of an intermediate transfer belt cleaning unit. The intermediate transfer belt cleaning unit collects an untransferred toner adhering to the intermediate transfer belt 17 to complete a sequence of transfer processes performed on the intermediate transfer belt 17.

Here, the sheet P conveyed between the intermediate transfer belt 17 and the secondary transfer bias roller 18 (to a secondary transfer nip) is conveyed from the sheet feeding unit 7 via the registration roller 9 and the like.

More specifically, a sheet feeding roller 8 feeds the sheet P from the sheet feeding unit 7 that contains multiple sheets P, and the sheet P is then guided by a sheet guide to the registration roller 9. The sheet P that has reached the registration roller 9 is conveyed toward the secondary transfer nip, timed to coincide with the arrival of the multicolor toner image on the intermediate transfer belt 17.

Then, the sheet P carrying the multicolor toner image is conveyed to the fixing device 20. The fixing device 20 includes a fixing roller and a pressure roller pressing against each other. In a nip between the fixing roller and the pressure roller, the multicolor toner image is fixed on the sheet P.

After the fixing process, a sheet ejection roller ejects the sheet P as an output image outside the image forming apparatus 1, and the ejected sheet P is stacked on the sheet ejection tray 5. Thus, a series of the image forming processes is completed.

Next, a process cartridge 10 (image forming unit) in the image forming apparatus is described in detail with reference to FIGS. 2 and 3 and the like.

Figure 2:
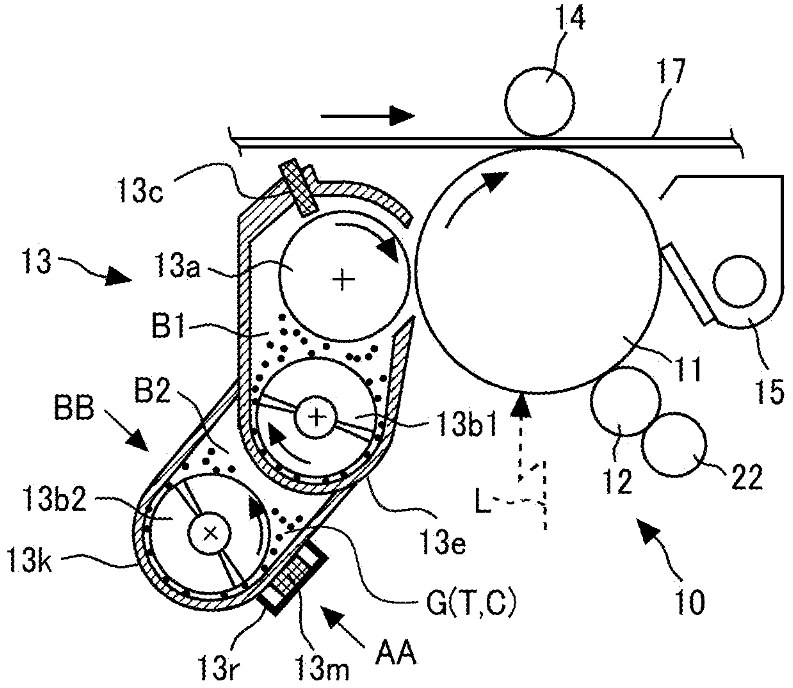
FIG. 2 is a diagram illustrating the configuration of an image forming unit.

FIG. 2 is a configuration diagram illustrating the process cartridge 10 (image forming unit), and is a diagram viewed in a cross section orthogonal to the rotation axis of the photoconductor drum 11. FIG. 3 is a schematic cross-sectional view (vertical cross-sectional view) of the developing device 13 as viewed in the longitudinal direction.

Figure 3:
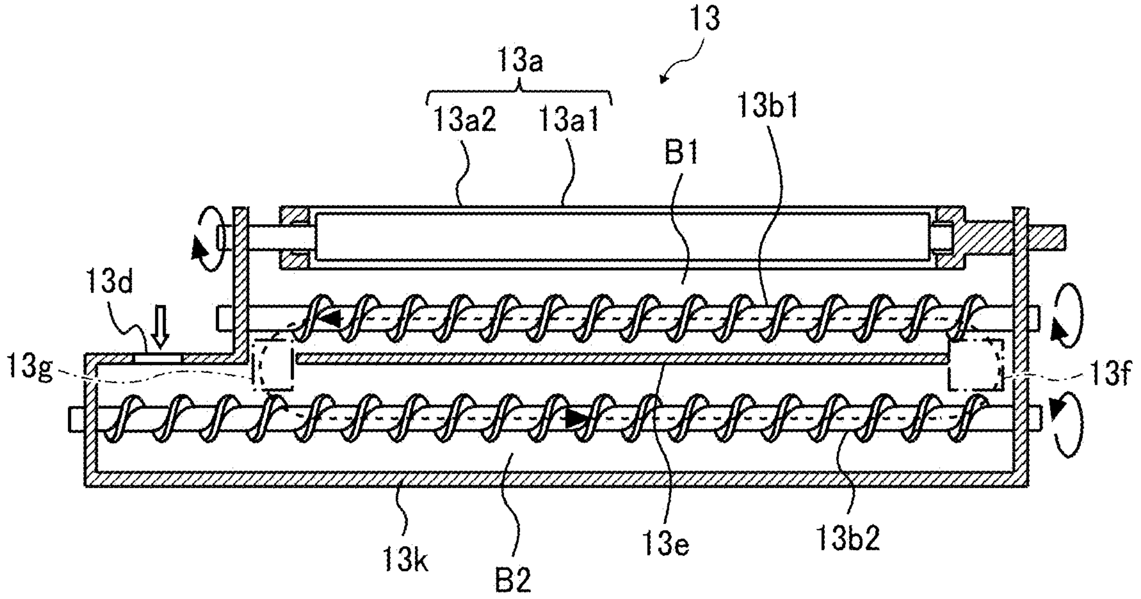
FIG. 3 is a schematic cross-sectional view of a developing device as viewed in a longitudinal direction.

Note that the alphabets of reference numerals (Y, M, C, and BK) of the process cartridge and the developing device are omitted in FIGS. 2 and 3 and the like for simplicity because the image forming units have a similar configuration.

As illustrated in FIG. 2, the process cartridge is a unit in which the photoconductor drum 11 as the image bearer, the charging unit 12 (and a cleaning roller 22), the developing device 13, and the cleaning unit 15 are integrated, and is detachably installed with respect to a main body 100 of the image forming apparatus. When the process cartridge 10 reaches its end of life, the process cartridge 10 is detached from the main body 100 of the image forming apparatus, and replaced with a new one.

The photoconductor drum 11 as the image bearer is a negatively charged organic photoconductor, and is rotationally driven clockwise by a rotation drive mechanism.

The charging unit 12 is an elastic charging roller and can be formed by coating a cored bar with an elastic layer of moderate resistivity, such as foamed urethane, that includes carbon black as conductive particles, a sulfuration agent, a foaming agent, and the like. The material of the elastic layer of moderate resistivity of the charging unit 12 includes, but is not limited to, rubber such as urethane, ethylene-propylene-diene-polyethylene (EPDM), acrylonitrile butadiene rubber (NBR), silicone rubber, and isoprene rubber to which a conductive material such as carbon black or metal oxide is added to adjust the resistivity. Alternatively, foamed rubber including these materials may be used.

The cleaning roller 22 is disposed so as to abut on the charging unit 12 (charging roller), and cleans foreign matter adhering to the surface of the charging unit 12.

The cleaning unit 15 includes a cleaning blade that slidingly contacts the surface of the photoconductor drum 11 and mechanically removes an untransferred toner on the photoconductor drum 11.

The developing device 13 (developing unit) is disposed such that a developing roller **13*a* as a developer bearer faces the photoconductor drum 11 with a slight gap therebetween via an opening (formed in a developing case 13*k*), and a developing region where the photoconductor drum 11 and a magnetic brush (a developer G standing on end) are in contact is formed in a portion where the developing roller 13*a* faces the photoconductor drum 11. The developing device 13 contains a developer G (two-component developer) including a toner T and a carrier C. The developing device 13 develops the electrostatic latent image formed on the surface of the photoconductor drum 11 (forms a toner image). The configuration and operation of the developing device 13** are described in further detail later.

With reference to FIG. 1, the toner containers 28 contain the toner T to be supplied to the developing devices 13.

Specifically, the toner T is appropriately supplied from a supply port **13*d* (see FIG. 3) from the toner container 28 into the developing device 13 through a toner conveying pipe on the basis of the data of a toner concentration (the ratio of the toner in the developer G) detected by a toner concentration sensor 13*m* (see FIG. 2) such as a magnetic sensor installed in the developing device 13**.

Next, the developing device 13 of the image forming apparatus is described in further detail below.

With reference to FIGS. 2 and 3, the developing device 13 includes the developing roller **13*a* as the developer bearer, a supply screw 13*b*1 as a first conveying member, a conveying screw 13*b*2 as a second conveying member, a doctor blade 13*c* as a developer regulating member, a partition member 13*e* as a wall portion, a developing case 13*k* covering the developing device 13, and the toner concentration sensor 13*m* and the like. The members such as the developing roller 13*a*, the supply screw 13*b*1, the conveying screw 13*b*2, the doctor blade 13*c*, and the partition member 13*e* are included in the developing case 13*k* (housing). The developing case 13*k* can also be said to be a case member that forms at least a part of the conveying path (first and second conveyance paths B1 and B2**) of the developer.

The developing roller **13*a* as the developer bearer is configured such that a sleeve 13*a*2 formed by forming a nonmagnetic material such as aluminum, brass, stainless steel, or conductive resin into a cylindrical shape is rotated in an arrow direction illustrated in FIG. 2 together with the supply screw 13*b*1 and the conveying screw 13*b*2 by a rotation drive mechanism. With reference to FIG. 3, a magnet 13*al* forming multiple magnetic poles on the peripheral surface of the sleeve 13*a*2 is fixed in the sleeve 13*a*2 of the developing roller 13*a*. The developer G carried on the developing roller 13*a* is conveyed along with the rotation of the developing roller 13*a* in a predetermined rotation direction (counterclockwise direction in FIG. 2), and reaches the position of the doctor blade 13*c* (developer regulating member). The amount of the developer G on the developing roller 13*a* is adjusted to a suitable amount by the doctor blade 13*c*, after which the developer G is conveyed to a position facing the photoconductor drum 11 (the developing region). Then, the toner is attracted to the latent image formed on the photoconductor drum 11** due to the effect of an electric field (electric field for development) generated in the developing region.

With reference to FIG. 2 and the like, the doctor blade **13*c* as the developer regulating member is a plate-like member disposed so as to face the upper side of the developing roller 13***a*. Then, the developing roller 13*a* rotates clockwise in FIG. 2, and the photoconductor drum 11 rotates clockwise in FIG. 2.

In the present embodiment, a counter developing method is used in which the developing roller 13*a* rotates counter with respect to the rotation direction of the photoconductor drum 11 in the developing region. Meanwhile, it is also possible to use a developing method in which the developing roller 13*a* rotates in a trading direction with respect to the rotation direction of the photoconductor drum 11 in the developing region.

The two conveying members (the supply screw 13*b*1 and the conveying screw 13*b*2) stir and mix the developer G stored in the developing device 13 while circulating the developer G in the longitudinal direction (is a direction perpendicular to the surface of the paper of FIG. 2, and is a left-right direction of FIG. 3). Each of the supply screw 13*b*1 and the conveying screw 13*b*2 is a screw member in which a screw is spirally wound around a shaft portion.

The supply screw 13*b*1 as the first conveying member is disposed so as to face the lower side of the developing roller 13*a*. The supply screw 13*b*1 supplies the developer to the developing roller 13*a* while conveying the developer G from one end side in the longitudinal direction toward the other end side in the longitudinal direction, and collects the developer separated from the developing roller 13*a*.

Specifically, the supply screw 13*b*1 (first conveying member) is disposed below the developing roller 13*a* at a position facing the developing roller 13*a*. The developer G is conveyed horizontally in the longitudinal direction (rotation axis direction) (conveyance from right to left indicated by a dashed arrow in FIG. 3). The developer G is supplied onto the developing roller 13*a* at the position of a scooping magnetic pole, and the developer G separated from the developing roller 13*a* and dropped at the position of a developer release magnetic pole is conveyed toward the downstream side in the axial direction. The supply screw 13*b*1 rotates clockwise in FIG. 2.

The conveying screw 13*b*2 as the second conveying member is disposed so as to face the lower side of the supply screw 13*b*1 (first conveying member), and conveys the developer G from the other end side in the longitudinal direction toward one end side in the longitudinal direction to form a circulation path of the developer G together with the supply screw 13*b*1.

Specifically, the conveying screw 13*b*2 (second conveying member) is disposed obliquely below the supply screw 13*b*1 at a position facing the developing roller 13*a* via the supply screw 13*b*1. The developer G is conveyed horizontally in the longitudinal direction in the second conveyance path B2 (conveyance from left to right indicated by the dashed arrow in FIG. 3). In the present embodiment, the rotation direction of the conveying screw 13*b*2 is set to be opposite to the rotation direction of the supply screw 13*b*1 (counterclockwise in FIG. 2).

In the conveying screw 13*b*2, the developer is circulated from the axially downstream side of the first conveyance path B1 by the supply screw 13*b*1 through a second communication portion 13*g* (second relay portion). The conveying screw 13*b*2 conveys the developer G to the upstream side in the axial direction of the first conveyance path B1 by the supply screw 13*b*1 via a first communication portion 13*f* (first relay portion) (conveyance indicated by the dashed arrow in FIG. 3).

Similarly to the developing roller 13*a* and the photoconductor drum 11, the supply screw 13*b*1 and the conveyance screw 13*b*2 are disposed such that rotation axes thereof are substantially horizontal. In each of the supply screw 13*b*1 and the conveying screw 13*b*2, a screw portion (one thread is formed at a predetermined screw pitch) is spirally wound around a shaft portion. In order to stabilize the conveyance of the developer, the screw portion may have multiple threads, and in particular, the screw portion of the supply screw 13*b*1 may have multiple threads.

Note that the first conveyance path B1 by the supply screw 13*b*1 and the second conveyance path B2 by the conveyance screw 13*b*2 are isolated from each other by the partition member 13*e* (wall portion).

With reference to FIG. 3, the upstream side of the first conveyance path B1 by the supply screw 13*b*1 and the downstream side of the second conveyance path B2 by the conveyance screw 13*b*2 communicate with each other via the first communication portion 13*f*. The developer G having reached the downstream side of the second conveyance path by the conveying screw 13*b*2 stays in the vicinity of the first communication portion 13*f* and rises. The developer G is conveyed (supplied) to the upstream side of the first conveyance path B1 by the supply screw 13*b*1 via the first communication portion 13*f* With reference to FIG. 3, the downstream side of the first conveyance path B1 by the supply screw 13*b*1 and the upstream side of the second conveyance path B2 by the conveyance screw 13*b*2 communicate with each other via the second communication portion 13*g*. The developer G (the developer G that has not been supplied onto the developing roller 13*a* in the first conveyance path B1 and the developer G that has been separated from and dropped from the developing roller 13*a* at the position of a fourth magnetic pole) having reached the downstream side of the first conveyance path B1 by the supply screw 13*b*1 falls by its own weight at the second communication portion 13*g* and reaches the upstream side of the second conveyance path B2.

The toner concentration sensor 13*m* such as a magnetic sensor that detects the toner concentration of the developer G circulating in the developing device 13 is installed in the developing case 13*k* (a portion corresponding to the second conveyance path B2). Based on the data of the toner concentration detected by the toner concentration sensor 13*m*, a new toner T is supplied from the toner container 28 into the developing device 13 via the supply port 13*d* (disposed on the outer side in the longitudinal direction with respect to the second communication portion 13*g*) so that the toner concentration falls within a target range.

With reference to FIG. 3, the supply port 13*d* (toner supply port) is disposed above the upstream side of the second conveyance path B2 by the conveying screw 13*b*2 at a position away from the developing region (outside the range in the longitudinal direction of the developing roller 13*a*). The new toner T discharged from the toner container 28 is appropriately supplied from the supply port 13*d* into the developing device 13 (supply in the direction of a white arrow in FIG. 3). By disposing the supply port 13*d* in the vicinity of the second communication portion 13*g* in this manner, it is possible to sufficiently disperse and mix the supply toner over a relatively long time with respect to the developer G dropped by its own weight from the second communication portion 13*g* toward the downstream side in the second conveyance path B2.

In the present embodiment, the supply port 13*d* is disposed in the second conveyance path B2, but the position of the supply port 13*d* is not limited thereto, and for example, the first conveyance path B1 may be extended in the longitudinal direction and disposed above the downstream side.

As the developer G used in the present embodiment, a known developer can be used.

For example, as the toner T (the toner in the developer G, the toner in the toner container 28), a small-diameter toner that is a polymerization toner and has a volume average particle diameter of about 5.8 μm can be used.

As the carrier C in the developer G, a small-diameter carrier formed to have a weight average particle diameter of 20 to 60 μm can be used.

Hereinafter, the characteristic configuration and operation of the developing device 13 according to the present embodiment are described.

As described above with reference to FIG. 2 and the like, the developing device 13 according to the present embodiment includes the developing case 13*k* that forms at least a part of the conveying path (first and second conveyance paths B1 and B2) of the developer, and the toner concentration sensor 13*m* that detects the toner concentration of the developer G stored in the developing device 13.

In the present embodiment, a magnetic sensor that magnetically detects the toner concentration of the developer G is used as the toner concentration sensor 13*m*. The developing case 13*k* is made of a nonmagnetic resin material or the like.

Figure 4:
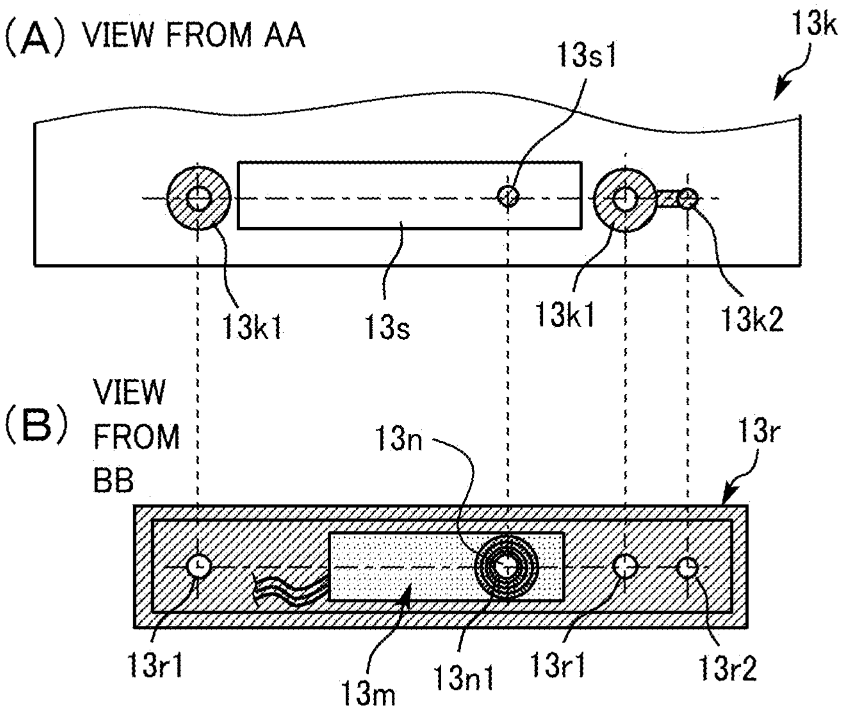
FIG. 4 includes a diagram of part (A) illustrating a developing case viewed from a direction indicated arrow AA of FIG. 2 and a diagram of part (B) illustrating a sensor holder holding a toner concentration sensor viewed from a direction indicated by arrow BB of FIG. 2.
Figure 5:
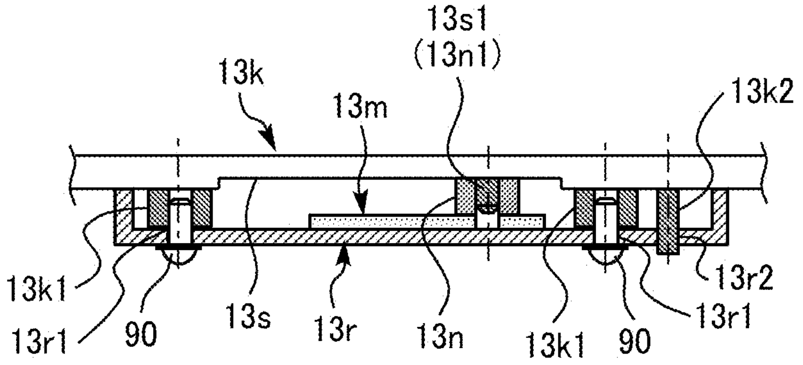
FIG. 5 is a cross-sectional view illustrating a state where the sensor holder holding the toner concentration sensor is installed in the developing case.

Here, as illustrated in FIGS. 2, 4, and 5, in the developing device 13 according to the present embodiment, a sensor holder 13*r* that holds the toner concentration sensor 13*m* is held by the developing case 13*k*.

The sensor holder 13*r* is a substantially rectangular parallelepiped box-shaped member formed of a nonmagnetic resin material or the like, and is detachably installed on the developing case 13*k* by fastening a screw 90 so as to cover the toner concentration sensor 13*m*.

In the sensor holder 13*r*, the toner concentration sensor 13*m* is fixed and held by fastening a screw or the like, and is attached to or detached from the developing device 13 together with the toner concentration sensor 13*m* during producing or maintenance or the like.

Furthermore, a connector to which the harness of the toner concentration sensor 13*m* is connected is exposed to the sensor holder 13*r*. When the sensor holder 13*r* is attached to and detached from the developing case 13*k*, the connector is connected to and detached from the case-side connector of the developing case 13*k*.

Furthermore, as illustrated in FIGS. 4 and 5, the developing device 13 includes a projection 13*s*1 as a positioning unit that engages with (fit into) a hole 13*n*1 as an engaging portion formed at the center of a sensor main section 13*n* (a sensing surface is formed, is responsible for the central function of the sensor, and is a portion directly affecting sensor accuracy) of the toner concentration sensor 13*m* to determine the position of the sensor main section 13*n* in the developing case 13*k*.

The projection 13*s*1 as the positioner is formed on an installation surface 13*s* of the developing case 13*k* so as to be fittable into the hole 13*n*1 (in the present embodiment, a through hole having a circular cross section) of the sensor main section 13*n*. In other words, in addition to the projection 13*s*1, the hole 13*n*1 of the sensor main section 13*n* functions as the positioner.

The installation surface 13*s* of the developing case 13*k* is a rectangular flat surface facing the toner concentration sensor 13*m* having a substantially rectangular outer shape, and the boss-shaped projection 13*s*1 protrudes in the vertical direction on the side away from the developing case 13*k*. As described above, in the present embodiment, the toner concentration sensor 13*m* (sensor main section 13*n*) detects the toner concentration of the developer G in the developing device 13 via the developing case 13*k* (installation surface 13*s*).

In the present embodiment, the sensor main section 13*n* is formed in a coil shape or an annular shape. That is, the sensor main section 13*n* is a substantially cylindrical member, and the hole 13*n*1 as the engaging portion is formed at the center of the sensor main section 13*n*.

As described above, in the developing device 13 according to the present embodiment, the projection 13*s*1 fitted into the hole 13*n*1 (engaging portion) at the center of the sensor main section 13*n* of the toner concentration sensor 13*m* is provided in the developing case 13*k* (installation surface 13*s*), whereby the position of the toner concentration sensor 13*m* (sensor main section 13*n*) with respect to the developing case 13*k* (installation surface 13*s*) is accurately determined at a target position. Therefore, every time the toner concentration sensor 13*m* is installed in the developing case 13*k* together with the sensor holder 13*r* during producing or maintenance or the like, a defect that the position of the toner concentration sensor 13*m* (sensor main section 13*n*) with respect to the developing case 13*k* deviates from a target position is reduced. Therefore, the toner concentration detected by the toner concentration sensor 13*m* and the control of toner supply performed based on the detection result are less likely to vary.

In particular, in the present embodiment, the toner concentration sensor 13*m* is fixed to the developing case 13*k* together with the sensor holder 13*r* in a state where the projection 13*s*1 of the developing case 13*k* is fitted into the hole 13*n*1 at the center of the sensor main section 13*n*. Therefore, even when the toner concentration sensor 13*m* (sensor holder 13*r*) is installed in the developing case 13*k* in a state of rotating around the projection 13*s*1, the sensor main section 13*n* is accurately positioned at a target position.

Since a direction in which the hole 13*n*1 and the projection 13*s*1 are fitted coincides with a direction in which the toner concentration sensor 13*m* (sensor holder 13*r*) is attached to and detached from the developing case 13*k*, the detachability thereof is also enhanced.

In the present embodiment, the hole 13*n*1 of the sensor main section 13*n* is a through hole, but the hole 13*n*1 may be a non-through hole (recessed hole).

Here, with reference to FIGS. 4 and 5, the developing device 13 according to the present embodiment includes first and second bosses 13*k*1 and 13*k*2 as a second positioner that determine the position of the sensor holder 13*r* in the longitudinal direction in the developing case 13*k*.

Specifically, the developing case 13*k* includes the two first bosses 13*k*1 (a female screw portion is formed at the central portion) so as to sandwich the installation surface 13*s*. Furthermore, the developing case 13*k* includes the second boss 13*k*2 so as to be adjacent to one first boss 13*kl*.

Meanwjile, the sensor holder 13*r* includes first through holes 13*r*I (screw holes) at positions corresponding to the two first bosses 13*k*1, respectively. Furthermore, the sensor holder 13*r* includes a second through hole 13*r*2 (fitting hole) at a position corresponding to the second boss 13*k*2.

As illustrated in FIG. 5, in a state where the projection 13*s*1 is fitted into the hole 13*n*1 and the second boss 13*k*2 is fitted into the second through hole 13*r*2, the screw 90 is screwed into the female screw portion of the first boss 13*k*1 through the first through hole 13*r*1, whereby the position of the sensor holder 13*r* in the longitudinal direction with respect to the developing case 13*k* is determined. In other words, the sensor holder 13*r* (toner concentration sensor 13*m*) is fixed and held on the developing case 13*k* so as not to rotate about the projection 13*s*1 (hole 13*n*1).

In the present embodiment, the fitting between the projection 13*s*1 and the hole 13*n*1 is main positioning, whereby the positioning between the first and second bosses 13*kl* and 13*k*2 and the first and second through holes 13*r*1 and 13*r*2 described above is preferably performed in a sub-manner so as not to affect the fitting between the projection 13*s*1 and the hole 13*n*1. Specifically, it is preferable that the hole diameters of the first and second through holes 13*r*1 and 13*r*2 are relatively loose with respect to the female screw diameter and the boss diameter of the first and second bosses 13*k*1 and 13*k*2.

First Modification

Figure 6:
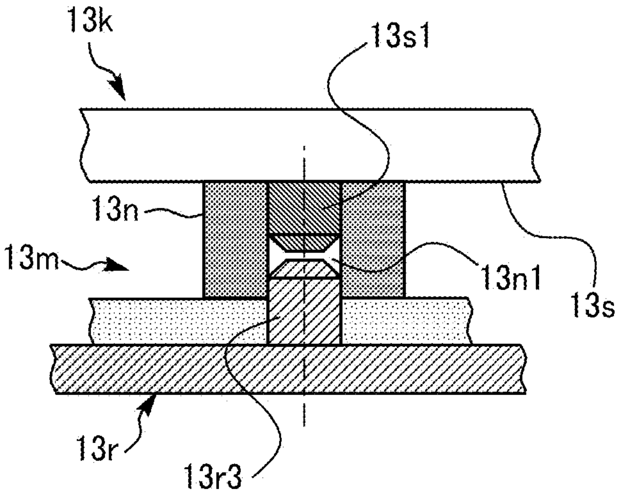
FIG. 6 is an enlarged cross-sectional view illustrating a state where a sensor holder holding a toner concentration sensor is installed in a developing case as a first modification.

As illustrated in FIG. 6, in a developing device 13 according to a first modification, a sensor holder 13*r* includes a protrusion 13*r*3 to fit into a hole 13*n*1 (engaging portion) of a sensor main section 13*n* from a side facing a projection 13*s*1 of a developing case 13*k* that fits in the hole 13*n*1.

Specifically, the protrusion 13*r*3 is a boss-shaped member having a circular cross section, and is formed so as to protrude in a direction perpendicular to the sensor main section 13*n* side on the inner wall surface of the sensor holder 13*r*. In a state where the protrusion 13*r*3 is inserted into the hole 13*n*1 of the sensor main section 13*n*, a toner concentration sensor 13*m* (sensor main section 13*n*) is positioned with respect to the sensor holder 13*r*.

With this configuration, the positional accuracy of the toner concentration sensor 13*m* (sensor main section 13*n*) with respect to the developing case 13*k* is enhanced in a state where the positional accuracy of the toner concentration sensor 13*m* (sensor main section 13*n*) with respect to the sensor holder 13*r* is enhanced. Therefore, the positional accuracy of the sensor holder 13*r* with respect to the developing case 13*k* can also be enhanced.

In the first modification, as illustrated in FIG. 6, the projection 13*s*1 and the protrusion 13*r*3 fit in the hole 13*n*1 in non-contact with each other. That is, in the hole 13*n*1, a gap is provided between the leading end of the projection 13*s*1 and the leading end of the protrusion 13*r*3. With this configuration, the projection 13*s*1 and the protrusion 13*r*3 contact each other in the hole 13*n*1, to suppress a defect that the toner concentration sensor 13*m* and the sensor holder 13*r* are deformed.

Also in the first modification, the position of the toner concentration sensor 13*m* (sensor main section 13*n*) with respect to the developing case 13*k* is accurately determined at a target position.

Second Modification

Figure 7:
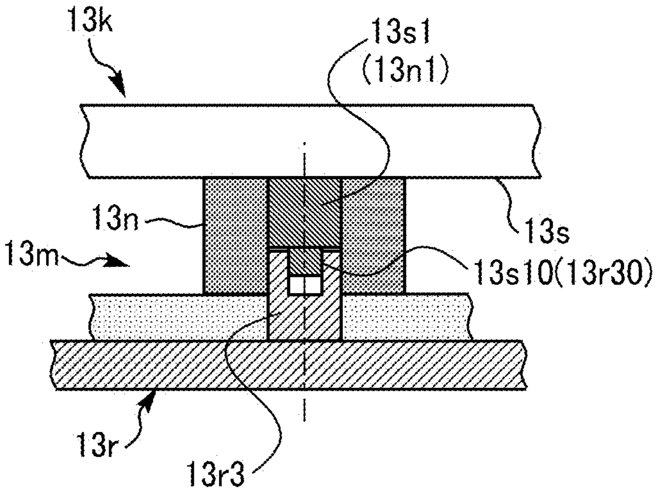
FIG. 7 is an enlarged cross-sectional view illustrating a state where a sensor holder holding a toner concentration sensor is installed in a developing case as a second modification.

As illustrated in FIG. 7, also in a developing device 13 according to a second modification, similarly to the first modification, a sensor holder 13*r* includes a protrusion 13*r*3 fitted into a hole 13*n*1 (engaging portion).

Here, in the second modification, a projection 13*s*1 of a developing case 13*k* and the protrusion 13*r*3 of the sensor holder 13*r* are configured to be fitted into each other in the hole 13*n*1 of a sensor main section 13*n*.

Specifically, a shaft-shaped fitting portion 13*s*10 is formed at the end of the projection 13*s*1, and a recessed fitted portion 13*r*30 into which the fitting portion 13*s*10 is fitted is formed at the end of the protrusion 13*r*3.

With this configuration, the positional accuracy of the sensor holder 13*r* with respect to the developing case 13*k* can be directly enhanced.

Also in the second modification, the position of a toner concentration sensor 13*m* (sensor main section 13*n*) with respect to the developing case 13*k* is accurately determined at a target position.

Third Modification

Figure 8A:
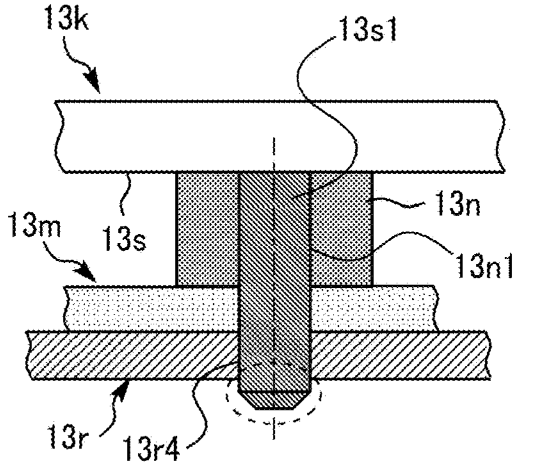
FIGS. 8A to 8B are enlarged cross-sectional views illustrating a state where a sensor holder holding a toner concentration sensor is installed in a developing case as a third modification.

As illustrated in FIG. 8A, in a developing device 13 according to a third modification, in a sensor holder 13*r*, an insertion portion 13*r*4 (through hole) into which the end of a projection 13*s*1 that is fitted into and penetrates a hole 13*n*1 (engaging portion) of a sensor main section 13*n* is inserted is formed.

Specifically, the projection 13*s*1 of a developing case 13*k* is formed to be sufficiently longer than the depth of the hole 13*n*1 (through hole), and the end thereof penetrates the insertion portion 13*r*4 of the sensor holder 13*r* and is exposed to the outside (a portion surrounded by a dashed line).

Figure 8B:
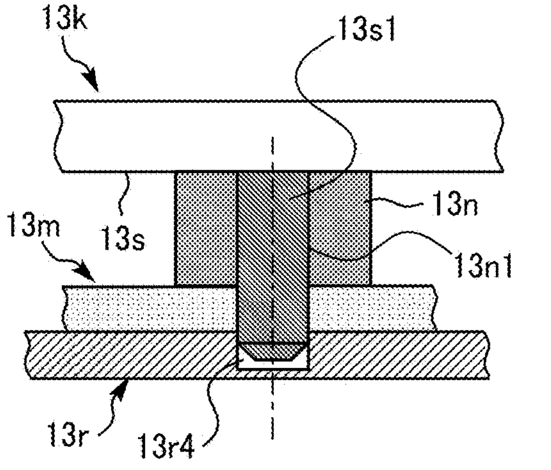

As illustrated in FIG. 8B, the insertion portion 13*r*4 of the sensor holder 13*r* may be formed as a non-through hole (recessed hole) so that the end of the projection 13*s*1 is not exposed to the outside.

With the configuration as illustrated in FIGS. 8A and 8B, the positional accuracy of the sensor holder 13*r* with respect to the developing case 13*k* can be directly enhanced.

Also in the third modification, the position of a toner concentration sensor 13*m* (sensor main section 13*n*) with respect to the developing case 13*k* is accurately determined at a target position.

Fourth Modification

Figure 9:
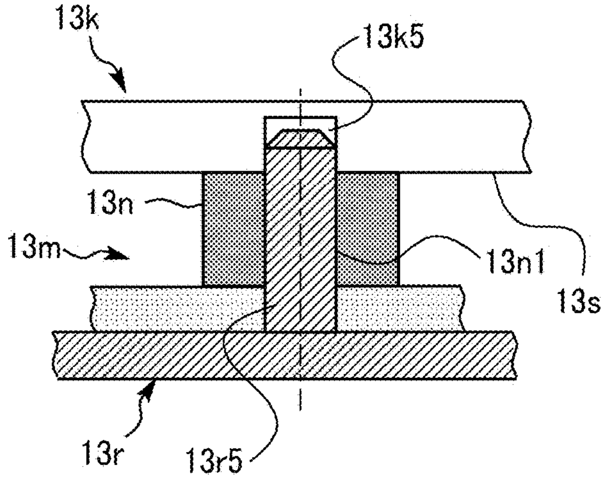
FIG. 9 is an enlarged cross-sectional view illustrating a state where a sensor holder holding a toner concentration sensor is installed in a developing case as a fourth modification.

As illustrated in FIG. 9, a developing device 13 according to a fourth modification is different from those of the above-described embodiments in the configuration of a positioner that determines the position of a toner concentration sensor 13*m* (sensor main section 13*n*) with respect to a developing case 13*k*.

As illustrated in FIG. 9, the positioner in the fourth modification includes a shaft portion 13*r*5 (a boss-shaped member having a circular cross section) formed in a sensor holder 13*r* so as to be fittable into a hole 13*n*1 of the sensor main section 13*n*, and an insertion and fitting portion 13*k*5 (a non-through hole (recessed hole) having a circular cross section) formed in the developing case 13*k* so that the end of the shaft portion 13*r*5 that is fitted into and penetrates through the hole 13*n*1 can be inserted and fitted.

Even in such a configuration, the position of the toner concentration sensor 13*m* (sensor main section 13*n*) with respect to the developing case 13*k* is accurately determined at a target position. Furthermore, the positional accuracy of the sensor holder 13*r* with respect to the developing case 13*k* can be directly enhanced.

As described above, the developing device 13 according to the present embodiment is the developing device that stores the developer G including the toner T and the carrier C and develops the latent image formed on the surface of the photoconductor drum 11 (image bearer), and includes the developing case 13*k* that forms at least a part of the conveyance paths B1 and B2 of the developer G, and the toner concentration sensor 13*m* that detects the toner concentration of the developer G stored in the developing device 13. Furthermore, a projection 13$s$1 (positioner) is provided, which is fitted into (engaged with) the hole 13$n$1 (engaging portion) formed at the center of the sensor main section 13$n$ of the toner concentration sensor 13$m$ to determine the position of the sensor main section 13$n$ in the developing case 13$k$.

As a result, the position of the toner concentration sensor 13$m$ (sensor main section 13$n$) with respect to the developing case 13$k$ can be accurately determined at a target position.

In the present embodiment, the developing device 13 is one of the constituent members of the process cartridge 10. However, a developing device according to an embodiment of the present disclosure is not limited to the configuration of the developing device 13. For example, a developing device according to an embodiment of the present disclosure is configured as a unit to be alone attached to and detached from the main body of the image forming apparatus.

Here, in the present specification, the "process cartridge" is defined as a unit in which at least one of a charging unit (charging device) that charges an image bearer, a developing device (developing unit) that develops a latent image formed on the image bearer, and a cleaning unit (cleaning device) that cleans the image bearer and the image bearer are integrated and detachably installed with respect to a main body of an image forming apparatus.

In the present embodiment, the positioner (engaged portion) such as the projection 13$s$1 and the shaft portion 13$r$5 of the developing case 13$k$ is fitted into (engaged with) the hole 13$n$1 as the engaging portion formed at the center of the sensor main section 13$n$ of the toner concentration sensor 13$m$, but the relationship between the "engaging portion" and the"engaged portion" is not limited thereto, and for example, the "engaging portion" may be a recess (alternatively, a protrusion), and the "engaged portion" may be a protrusion (alternatively, a recess).

Even in such a case, it is possible to obtain substantially the same effects as those of the present embodiment.

The above-described embodiments do not limit the present disclosure. It is therefore to be understood that within the scope of the present disclosure, the embodiments may be appropriately practiced otherwise than as specifically described herein. The number, position, and shape of the components described above are not limited to those of the above-described embodiments. Suitable number, position, and shape can be determined to implement an embodiment of the present disclosure.

Aspects of the present disclosure may be, for example, any combination of the following first to eleventh aspects.

First Aspect

A developing device stores a developer including a toner and a carrier and develops a latent image formed on a surface of an image bearer. The developing device includes: a developing case forming at least a part of a conveyance path of the developer; a toner concentration sensor to detect a toner concentration of the developer stored in the developing device; and a positioner to engage with an engaging portion at a center of a sensor main section of the toner concentration sensor to determine a position of the sensor main section in the developing case.

Second Aspect

In the developing device according to the first aspect, the positioner includes a projection on the developing case to fit into a hole that is the engaging portion of the sensor main section.

Third Aspect

The developing device according to the second aspect further includes a sensor holder that holds the toner concentration sensor and is held by the developing case. The sensor holder includes a protrusion to fit into the hole from a side facing the projection that fits into the hole.

Fourth Aspect

In the developing device according to the third aspect, the projection and the protrusion fit in the hold in non-contact with each other.

Fifth Aspect

In the developing device according to the third aspect, the projection and the protrusion fit with each other in the hole.

Sixth Aspect

The developing device according to the second aspect further includes a sensor holder that holds the toner concentration sensor and is held by the developing case. The sensor holder includes an insertion portion into which an end of the protrusion portion fitting into and penetrating through the hole is inserted.

Seventh Aspect

The developing device according to the first aspect further includes a sensor holder that holds the toner concentration sensor and is held by the developing case. The positioner includes: a shaft portion of the sensor holder to fit into a hole that is the engaging portion of the sensor main section; and an insertion fitting portion of the developing case into which an end of the shaft portion fitting in and penetrating through the hole is to be inserted to fit.

Eighth Aspect

The developing device according to any one of the third and seventh aspects further includes a second positioner to determine a longitudinal position of the sensor holder in the developing case.

Ninth Aspect

In the developing device according to any one of the first to eighth aspects, the sensor main section has a coil shape or an annular shape.

Tenth Aspect

A process cartridge is detachably installable with respect to a main body of an image forming apparatus. The process cartridge includes: the developing device according to any one of the first to ninth aspects; and the image bearer integrated with the developing device as a single unit.

Eleventh Aspect

An image forming apparatus including: the developing device according to any one of the first to ninth aspects; and the image bearer.

The present disclosure is not limited to specific embodiments described above, and numerous additional modifications and variations are possible in light of the teachings within the technical scope of the appended claims. It is therefore to be understood that the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A developing device, comprising:

a developing case to store a developer containing toner and carrier to develop a latent image on a surface of an image bearer, the developing case including at least a part of a conveyance path of the developer;

a toner concentration sensor to detect a toner concentration of the developer in the developing case; and a positioner to engage with an engaging portion at a center of a sensor main section of the toner concentration sensor to determine a position of the sensor main section in the developing case, wherein the engaging portion of the sensor main section is a fixing hole, and the positioner includes a projection on the developing case to fit into the fixing hole, the developing device further comprises a sensor holder holding the toner concentration sensor, the sensor holder held by the developing case, the sensor holder includes an insertion portion into which an end of the projection fitting in and penetrating through the hole is inserted, the sensor holder further comprises two first holes and one second hole, each of the two first holes at opposite sides of the fixing hole of the sensor main section in a longitudinal direction, respectively, and the second hole is on a side of one of the two first holes opposite from the fixing hole so as to sandwich the one of the two first holes between the second hole and the fixing hole; and the developing case further comprises two first bosses and one second boss, and the two first bosses and the one second boss are disposed at positions corresponding to the two first holes and the one second hole respectively.

2. The developing device according to claim 1, wherein the sensor main section has a coil shape or an annular shape.

3. A process cartridge, comprising:

the developing device according to claim 1; and the image bearer integrated with the developing device as a single unit, wherein the process cartridge is installable to and detachable from a main body of an image forming apparatus.

4. An image forming apparatus comprising:

the developing device according to claim 1; and the image bearer.

5. The developing device according to claim 1, wherein the two first holes and the fixing hole are on a straight line in the longitudinal direction.

6. The developing device according to claim 1, wherein the two first holes, the fixing hole, and the second hole are on a straight line in the longitudinal direction.

7. A developing device, comprising:

a developing case to store a developer containing toner and carrier to develop a latent image on a surface of an image bearer, the developing case including at least a part of a conveyance path of the developer;

a toner concentration sensor to detect a toner concentration of the developer in the developing case; and a positioner to engage with an engaging portion at a center of a sensor main section of the toner concentration sensor to determine a position of the sensor main section in the developing case, wherein the engaging portion of the sensor main section is a hole, and the positioner includes a projection on the developing case to fit into the hole, the developing device further comprises a sensor holder holding the toner concentration sensor, the sensor holder held by the developing case, and the sensor holder includes a protrusion to fit into the hole from a side facing the projection that fits in the hole.

8. The developing device according to claim 7, wherein the projection and the protrusion fit in the hole in non-contact with each other.

9. The developing device according to claim 7, wherein the projection and the protrusion fit with each other in the hole.

10. The developing device according to claim 7, further comprising another positioner to determine a longitudinal position of the sensor holder in the developing case.

11. A process cartridge, comprising:

the developing device according to claim 7; and the image bearer integrated with the developing device as a single unit, wherein the process cartridge is installable to and detachable from a main body of an image forming apparatus.

12. An image forming apparatus comprising:

the developing device according to claim 7; and the image bearer.

13. A developing device, comprising:

a developing case to store a developer containing toner and carrier to develop a latent image on a surface of an image bearer, the developing case including at least a part of a conveyance path of the developer, a sensor holder holding the toner concentration sensor, the sensor holder held by the developing case, a toner concentration sensor to detect a toner concentration of the developer in the developing case, and a positioner, that is a shaft portion of the sensor holder, to engage with a hole at a center of a sensor main section of the toner concentration sensor, wherein the developing case further includes an insertion fitting portion, into which an end of the shaft portion fitting in and penetrating through the hole is to be inserted to fit, to determine a position of the sensor main section in the developing case.

14. A process cartridge, comprising:
the developing device according to claim 13; and
the image bearer integrated with the developing device as a single unit,
wherein the process cartridge is installable to and detachable from a main body of an image forming apparatus.

15. An image forming apparatus comprising:
the developing device according to claim 13; and
the image bearer.

* * * * *